(12) United States Patent
Schilling

(10) Patent No.: US 6,529,546 B2
(45) Date of Patent: *Mar. 4, 2003

(54) ACQUISITION OF A SPREAD-SPECTRUM SIGNAL USING COUNTERS

(75) Inventor: Donald L. Schilling, Palm Beach Gardens, FL (US)

(73) Assignee: Linex Technologies, Inc., West Long Branch, NJ (US)

( * ) Notice: Subject to any disclaimer, the term of this patent is extended or adjusted under 35 U.S.C. 154(b) by 145 days.

This patent is subject to a terminal disclaimer.

(21) Appl. No.: 09/781,700

(22) Filed: Feb. 13, 2001

(65) Prior Publication Data

US 2002/0001338 A1 Jan. 3, 2002

Related U.S. Application Data

(62) Division of application No. 09/580,981, filed on May 30, 2000.
(51) Int. Cl.[7] .......................... H04B 15/00; H04K 1/00; H04L 27/30
(52) U.S. Cl. ................. 375/150; 375/343; 375/367
(58) Field of Search ............... 375/142, 143, 375/145, 149, 150, 151, 152, 153, 343, 367, 368; 370/515

(56) References Cited

U.S. PATENT DOCUMENTS

| | | | |
|---|---|---|---|
| 3,760,355 A | 9/1973 | Brucket ........... | 708/212 |
| 5,216,693 A | 6/1993 | Nakamura ........... | 375/142 |
| 5,757,869 A | 5/1998 | Sands et al. ........... | 375/366 |
| 5,901,189 A | 5/1999 | Rose ........... | 375/368 |
| 6,259,725 B1 | 7/2001 | Schilling ........... | 375/150 |

*Primary Examiner*—Phuong Phu
(74) *Attorney, Agent, or Firm*—David Newman Chartered

(57) ABSTRACT

An improvement for obtaining synchronization to a chip-sequence signal. The chip-sequence signal has a plurality of chips, and is embedded in a spread-spectrum signal. A set of M shift registers stores a replica or delayed replica of the chip-sequence signal. Each shift register has a plurality of taps, which correspond to the plurality of chips. A plurality of comparators compares, with a delay of 1/M chip duration per shift register, the chip-sequence signal embedded in the spread-spectrum signal with the replica of the chip-sequence signal stored in the set of M shift registers. From the comparison, the plurality of comparators generates, for each tap of the shift register, a plurality of compared values at each comparator of the plurality of comparators. A plurality of counters up and down counts, from each comparator, a respective plurality of compared values. The respective plurality of compared values appears at an output of a respective comparator of the plurality of comparators. The plurality of counters thereby generates a plurality of totals, respectively. A selector device selects a value from the plurality of totals. The selected value may be, by way of example, a largest value, a maximum likely value. The invention can be extended to one or more samples per chip, and each sample may have one bit for hard decision, or more bits for soft decision.

30 Claims, 5 Drawing Sheets

ACQUISITION OF A SPREAD-SPECTRUM SIGNAL USING COUNTERS

This application is a division of application Ser. No. 09/580,981, filed May 30, 2000.

BACKGROUND OF THE INVENTION

This invention relates to acquisition of a direct-sequence, spread-spectrum signal, and more particularly to an improvement in apparatus and method using counters with a bank of product devices.

DESCRIPTION OF THE RELEVANT ART

Code division multiple access (CDMA) or spread-spectrum receivers are made either using a single correlator, a matched filter, or a bank of correlators. A typical prior art approach, shown in FIG. 1, is to generate an in-phase component and a quadrature-phase component of a spread-spectrum signal, with in-phase mixer 17 and quadrature-phase mixer 18. The in-phase mixer 17 multiplies the spread-spectrum signal with a cosine signal at the spread-spectrum carrier frequency, $\cos(\omega_o t)$, and the quadrature-phase mixer 18 multiplies the spread-spectrum signal with a sine signal at the spread-spectrum frequency, $\sin(\omega_o t)$. The resulting in-phase component is despread by an in-phase despreader 19, and the resulting the quadrature-phase component is despread by a quadrature-phase despreader 20. Outputs from the in-phase despreader 19 and the quadrature-phase despreader 20 are combined by a combiner 15. The in-phase despreader 19 and the quadrature-phase despreader 20, may be embodied as a matched filter having an impulse response matched to the chip-sequence signal, a correlator, or a bank of correlators. While the matched filter, correlator or bank of correlators eventually result in a synchronized system, major differences exist between them.

The single correlator compares, cross-correlates, the incoming spread-spectrum signal to a stored reference signal. The stored reference signal typically is a replica or delayed replica of the chip-sequence signal which forms the spread-spectrum signal. If the cross-correlation were not acceptable, then the reference signal is delayed or advanced and the procedure for cross-correlating is repeated, until synchronization is achieved. This procedure is a time consuming process and disadvantageous when fast acquisition is required.

The matched filter often is referred to as a camp and wait technique. The incoming signal slides through the matched filter until the incoming signal matches the replica of the chip-sequence signal, or impulse response of the matched filter. An output then occurs. The matched filter suffers from the fact that the adders employed are required to operate at a speed which is a high multiple of the chip rate, which is a large number. The many required adders also consumes power. Hence, power consumption and high speed are limitations of the matched filter.

The bank of correlators is a group of correlators in which the stored reference of each correlator is delayed from the stored reference for other correlators, by a fraction of a chip, most typically ½ of one chip. The adder used in each correlator is updated only once each chip, but many adders are required, one for each correlator. Thus, while the synchronization time achievable is the same as for the matched filter, a fundamental limitation of the bank or correlators is the large number of adders required.

SUMMARY OF THE INVENTION

A general object of the invention is to achieve comparable performance of the matched filter or bank of correlators, with significantly lower complexity as found in the matched filter or bank of correlators.

Another object of the invention is lower power consumption and ability to operate at higher chip rates than the designs of current matched filters and bank of correlators.

According to the present invention, as embodied and broadly described herein, an improvement for acquiring synchronization to a chip-sequence signal is provided. The chip-sequence signal has a plurality of chips. The improvement comprises a shift register, a plurality of comparators, a plurality of counters, and a selector. A spread-spectrum signal, as used herein, typically includes a sequence of bits represented as a data signal, multiplied by a sequence of chips represented as a chip-sequence signal, raised to a carrier frequence by a carrier signal. For synchronization, the data signal typically is a constant value, for example, a series of one bits, or has very slowly time-varying data.

A local reference signal continually is cycled through the shift register. The local reference signal is a replica or delayed replica of the chip-sequence signal. The shift register has a plurality of taps, which correspond to the plurality of chips.

The plurality of comparators is connected to the plurality of taps, respectively. The plurality of comparators may be embodied as one or more AND gates, OR gates and/or NOR gates, or as a product device. The plurality of comparators compares the incoming chip-sequence signal with the replica of the chip-sequence signal stored in the shift register. From the comparison, the plurality of comparators generates, for each tap of the shift register, a plurality of compared values at each output of each comparator of the plurality of comparators. From a sequence of comparisons occurring in time, a multiplicity of compared values appears at the output of a specific comparator.

The plurality of counters is connected to the plurality of comparators. The plurality of counters are designed to count up and down. The respective multiplicity of compared values appears at an output of a respective comparator of the plurality of comparators. The plurality of counters thereby generates a plurality of totals, respectively. A particular total results from a particular counter, up and down counting a particular multiplicity of compared values at the output of a particular comparator.

The selector is coupled to the plurality of counters. The selector selects a value from the plurality of totals. The selected value may be, by way of example, a largest value, a maximum likely value, or a value which exceeds a threshold. If in-phase and quadrature phase components are used, then these components are combined prior to comparing to a threshold.

The present invention also includes a method for acquiring synchronization to a chip-sequence signal embedded in a spread-spectrum signal. The chip-sequence signal has a plurality of chips. The method comprises the steps of storing a replica or delayed replica of the chip-sequence signal in a device having a plurality of taps corresponding to the plurality of chips, respectively; comparing the chip-sequence signal embedded in the spread-spectrum signal with the replica of the chip-sequence signal present at the plurality of taps, thereby generating for each tap of the device a plurality of compared values, respectively; up and down counting, from each output of the device, a respective plurality of compared values, respectively, thereby generating a plurality of totals, respectively; and selecting a value from the plurality of totals.

The term "processing bit", as encountered in soft decision, refers to the bit or bits, representing a chip in the shift register, and used thereafter for processing through the plurality of comparators and the plurality of counters. In a hard limiter, or hard decision, embodiment, there is one processing bit per sample of a chip. Thus, the compared value is represented as one processing bit, and the corresponding counter may count up or down by one bit. With soft decision, there are multiple processing bits per sample of a chip, and the compared vales are embodied as multiple processing bits. For example, for two processing bits, the counter counts up/down by one or two, and for three processing bits per chip sample, the counter counts up/down by one, two, three, or four or equivalently counts between one and eight. By having a preset counter, the counting process may be bypassed.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
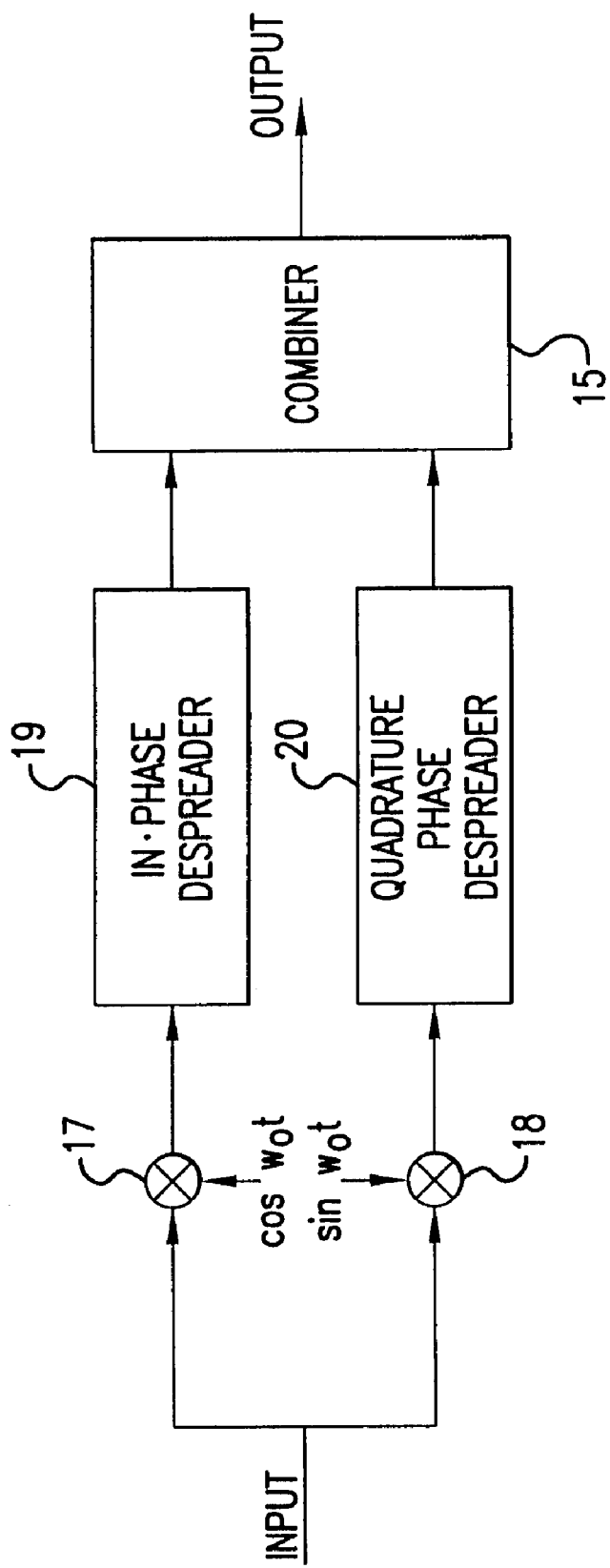
FIG. 1 is a prior art conceptual block diagram for generating and despreading, in-phase and quadrature-phase components of a spread-spectrum signal.

Reference now is made in detail to the present preferred embodiments of the invention, examples of which are illustrated in the accompanying drawings, wherein like reference numerals indicate like elements throughout the several views.

The present invention provides a novel approach for implementing synchronization to a direct-sequence, spread-spectrum signal. The approach uses a shift register, a bank of comparators, and a plurality of counters. The present invention has lower power consumption and can operate at higher chip rates, than systems discussed in the prior art, since the counters count at rates comparable to chip rates. The present invention may be realized from discrete components, a digital signal processor (DSP), an application specific integrated circuit (ASIC), and/or software using equivalent computer processing or DSP hardware.

The improvement for acquiring synchronization to a chip-sequence signal comprises shift-register means, comparator means, counter means and selecting means. A spread-spectrum signal, as used herein, typically includes a data signal, multiplied by a chip-sequence signal, and multiplied by a carrier signal. The data signal represents a sequence of data bits. The chip-sequence signal represents a sequence of chips, as normally used in a direct sequence, spread-spectrum signal. The carrier signal is at a carrier frequency, and raises the product of the data signal and the chip-sequence signal, to the carrier frequency. For synchronization, the data signal typically is a constant value, for example, a series of one bits, or has very slowly time-varying data. The spread-spectrum signal may be a packet, with a header followed by data, or a plurality of spread-spectrum channels, with one of the spread-spectrum channels used for synchronization. A particular spread-spectrum channel is defined by a particular chip-sequence signal, as is well known in the art. For the case of the packet, synchronization is performed on the header, as is well-known in the art. For a dedicated spread-spectrum channel, synchronization is performed from the dedicated channel.

The shift-register means has, for an output, a plurality of taps. The plurality of taps correspond to the plurality of chips used in the chip-sequence signal. The shift-register means shifts a replica or delayed replica of the chip-sequence signal, such that sequentially, a particular chip from the chip sequence used in the chip-sequence signal appears at each tap. If more than one sample per chip were used, then the shift-register means would have a separate set of taps for each sample per chip. If the chips are sampled as a soft decision, there also may be more than one processing bit per sample per chip. Thus, for example, two or three processing bits may represent a particular sample. The increase in processing bits per chip does not increase the number of taps to the shift-register means. The length of the counter means, discussed below, is altered, however.

The comparator means is connected to the plurality of taps, respectively, of the shift-register means. The comparator means has a plurality of comparison outputs, which correspond to the plurality of taps, respectively. The comparator means compares the chip-sequence signal embedded in the spread-spectrum signal with the replica of the chip-sequence signal stored in the shift-register means. For the plurality of taps of the shift register, the comparison generates a plurality of compared values at the plurality of comparison outputs. For a corresponding tap, for each comparison over time, there is generated a multiplicity of compared values at a corresponding comparison output.

The counter means is connected to each comparison output of the comparator means. The counter means has a plurality of counter outputs, which correspond to the plurality of comparison outputs of the comparison means. The counter means up and down counts, from each comparison output of the comparator means, a respective multiplicity of compared values, respectively. For a particular comparison out, the counter means generates a total. Thus, for the plurality of comparison outputs, the counter means generates a plurality of totals, respectively. At the plurality of counter outputs of the counter means, there is generated a plurality of totals. The plurality of totals takes into account the number of processing bits per sample, and the total number of chips in the chip-sequence signal.

The selecting means is coupled to the counter means. The selecting means selects a value from the plurality of totals. The chip-sequence signal has a plurality of chips, and is embedded in a spread-spectrum signal.

Figure 2:
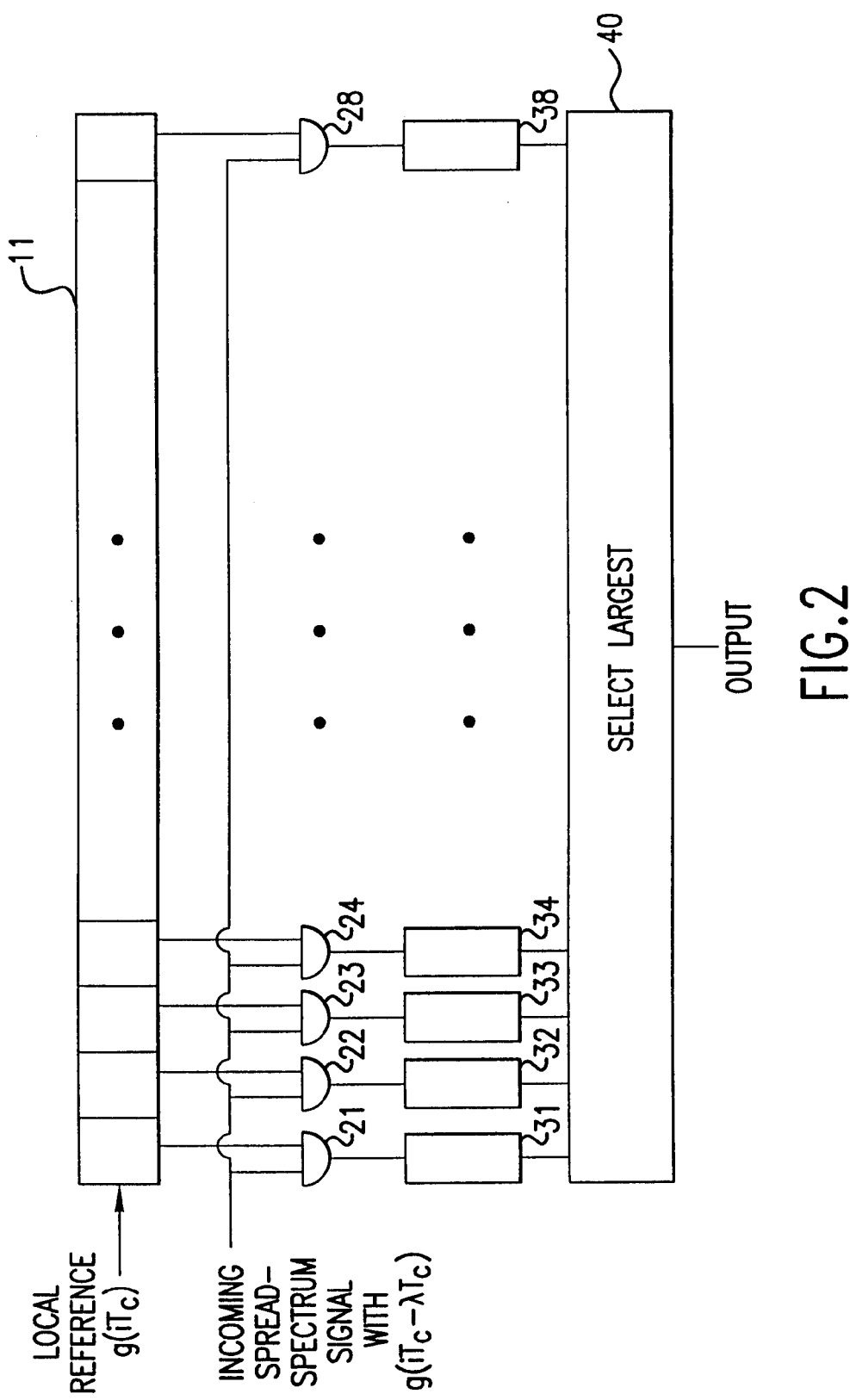
FIG. 2 is a block diagram of a bank of correlators with a bank of counters for one sample per chip for a chip-sequence signal employing 256 chips.

In the exemplary arrangement shown in FIG. 2, the shift-register means is embodied as a first shift register 11, the comparator means is embodied as a first plurality of comparators 21, 22, 23, 24, 28, the counter means is embodied as a first plurality of counters 31, 32, 33, 34, 38, and the selector means is embodied as a selector 40. The first plurality of comparators 21, 22, 23, 24, 28 is connected or coupled to the first shift register 11. The first plurality of counters 31, 32, 33, 34, 38 is connected to the first plurality of comparators 21, 22, 23, 24, 28, respectively. The selector 40 is connected to the first plurality of counters 31, 32, 33, 34, The first shift register 11 has a plurality of taps, which correspond to the plurality of chips. The first shift register 38. 11 shifts, or cycles, a replica or delayed replica of the chip-sequence signal $g(iT_C)$, where i is an index, and typically corresponds to time, and $T_C$ is the time duration of a chip. Sequentially, at each tap of the first shift register 11, a chip of the chip-sequence signal appears over time, as the index i is incremented.

Figure 3:
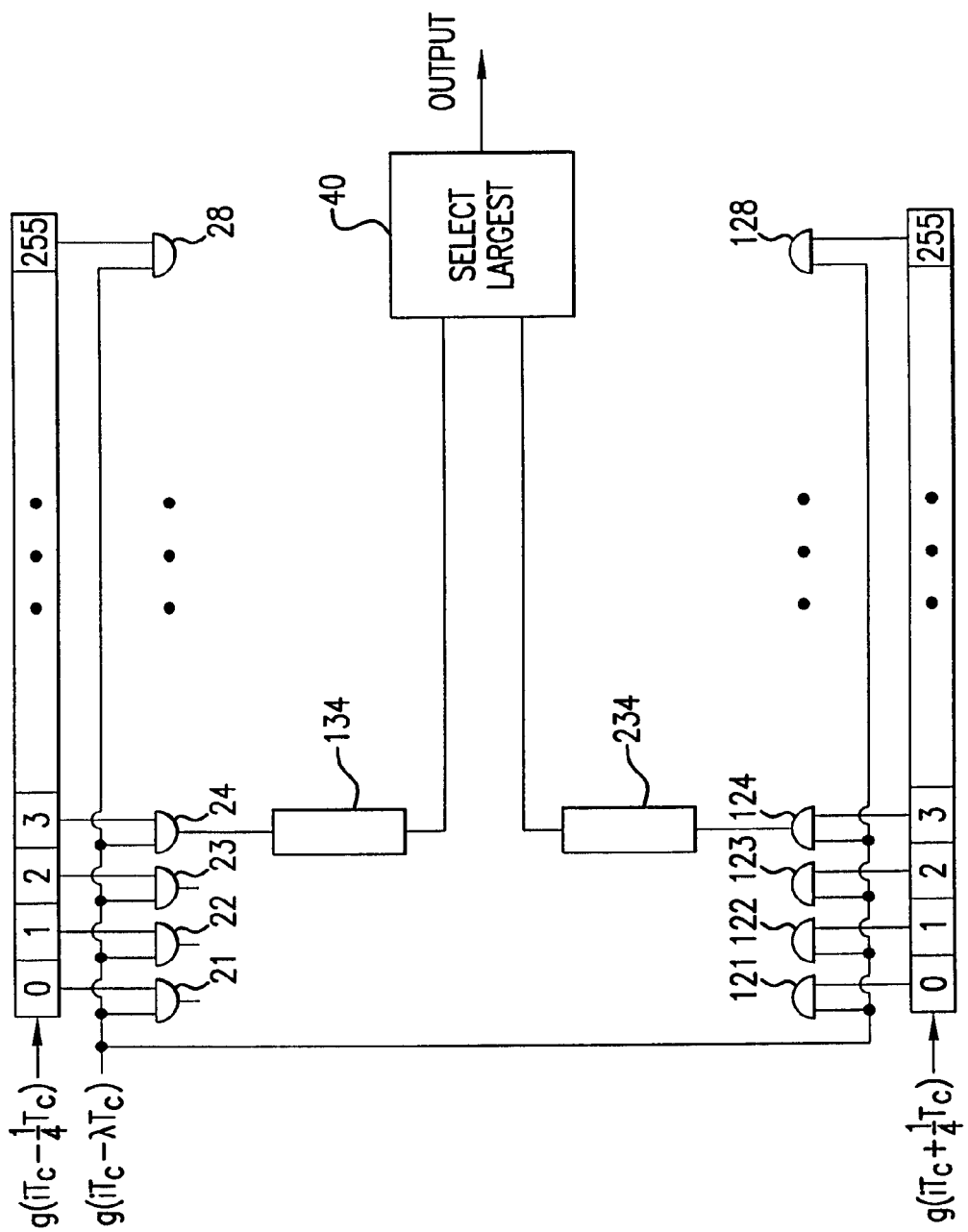
FIG. 3 shows a modification to FIG. 2, implementing two samples per chip for a chip-sequence signal employing 255 chips and hence 512 samples.

If more than one sample per chip were used, then there would be a separate bank of correlators for each sample. If two samples per chip were employed, by way of example, as shown in FIG. 3, then two banks of correlators would be used. The second bank of correlators includes a second shift register 111 a second plurality of comparators 121, 122, 123, 124, 128, a second plurality of counters, with only one counter 234 from the second plurality of counters shown. The second plurality of comparators 121, 122, 123, 124, 128 is connected or coupled to the second shift register 111. The second plurality of counters is connected to the second plurality of comparators 121, 122, 123, 124, 128, respectively. The selector 40 is connected to the second plurality of counters.

The second shift register 111 has a plurality of taps, which correspond to the plurality of chips. The second shift register 111 shifts, or cycles, a replica or delayed replica of the chip-sequence signal $g(iT_C)$, where i is an index, and typically corresponds to time, and $T_C$ is the time duration of a chip. Sequentially, at each tap of the second shift register 111, a chip of the chip-sequence signal appears over time, as the index i is incremented. The incoming spread-spectrum signal is delayed, as shown in FIG. 3, with respect to the input to the first plurality of comparators, and the input to the second plurality of comparators, by ½ chip.

Similarly, if the invention were extended to M samples per chip, then M banks of correlators are required. For M samples per chip, the incoming spread-spectrum signal is delayed, with respect to the input to the first plurality of comparators, and the input to the subsequent M plurality of comparators, by 1/M chip.

The first plurality of comparators 21, 22, 23, 24, 28 is connected to the plurality of taps, respectively, of the shift register 11. The number of comparators in the first plurality of comparators 21, 22, 23, 24, 28 is equal to the number of taps of the first shift register 11. The first plurality of comparators 21, 22, 23, 24, 28 compares the chip-sequence signal $g(iT_C-\lambda T_C)$, and the replica of the chip-sequence signal cycled through the first shift register 11. The parameter λ represents a delay between the chip-sequence signal $g(iT_C-\lambda T_C)$ embedded in the spread-spectrum signal, and the replica of the chip-sequence signal $g(iT_C)$ at the input to the first stage in the first shift register 11. Each stage then receives $g(t-iT_C)$, where i is the stage number. From the comparison, the first plurality of comparators generates, for each tap of the first shift register 11, a plurality of compared values at each comparator of the first plurality of comparators 21, 22, 23, 24, 28.

If multiple samples per chip were employed, then the number of banks of correlators would increase proportionately. The number of comparators in the first plurality of comparators 21, 22, 23, 24, 28 thus equals the number of taps in the plurality of taps of the first shift register 11.

If soft decision were employed, then multiple processing bits per sample results. For multiple processing bits per sample, each comparator becomes a multiplier with 2, 4, 8, etc., possible outputs, depending on the number of processing bits per sample. At the output of each comparator, in a preferred embodiment, half of the values are negative and half are positive. For multiple processing bits per sample, each of the plurality of comparators 21, 22, 23, 24, 28 has the electronic circuitry for multiplying processing-bit words. A comparator may be realized from logic circuitry, such as AND gates, OR gates, EXCLUSIVE-OR gates, EXCLUSIVE-NOR gates, and combinations thereof, as is well-known in the art.

The term "processing bit" refers to the bit or bits, representing a chip in the shift register, and used thereafter for processing through the plurality of comparators and the plurality of counters. In a hard limiter embodiment, there is one processing bit per sample of a chip. Thus, the compared value is represented as one processing bit, and the corresponding counter may count up or down by one bit. When there are multiple processing bits per sample of a chip, the compared vales are embodied as multiple processing bits. For example, for two processing bits, the counter counts up/down by one or two, and for three processing bits per chip sample, the counter counts up/down by one, two, three or four, or equivalently counts up to eight, during each sample. Thus, the counting rate is increased if there are multiple processing bits per sample. By having a preset counter, the increased counting process may be bypassed, and the counting rate remains at the chip rate.

The first plurality of counters 31, 32, 33, 34, 38 is connected to the first plurality of comparators 21, 22, 23,24, 28. The plurality of counters 31, 32, 33, 34, 38 up and down counts, from each comparator, a respective plurality of compared values. A compared value typically is represented digitally, as a digital word. The respective plurality of compared values appears at an output of a respective comparator of the first plurality of comparators 21, 22, 23, 24, 28. The first plurality of counters 31, 32, 33, 34, 38 thereby generates a plurality of totals, respectively.

The selector 40 is coupled to the first plurality of counters 31, 32, 33, 34, 38. The selector 40 selects a value from the plurality of totals. The selected value may be, by way of example, a largest value, a maximum likely value, or value determined from other criteria, such as, the first value to exceed a threshold, an average value of the plurality of values, a mean-square value of the plurality of values, a median value of the plurality of values, etc.

Note that the correlator increments the adder by ±1, if a hard decision were used, for each chip. An up/down counter could be used rather than a complex adder. If 2-bits per chip sample were used, then the counter is required to count up or down, by 1 or 2. This is done by the appropriate input to the mode input and inserting one or two count pulses per sample. If 4-bits per chip sample were used, then the counter counts up or down by an integer between 1 to 8, that is, up to 8 count pulses per sample may be required. For synchronization, 4 bits of arithmetic may be excessive. However, the counter need only operate at $8f_C$ where $f_C$ is the chip rate.

Consider a chip-sequence of length L=256. Suppose the acquisition circuit is set to check every ½ chip. Then, as shown in FIG. 3, there would be two 256 stage shift registers, or two banks of correlators. This bank could be built, as shown in FIG. 3, using two of the correlators shown in FIG. 2. A first shift register 11 has a local reference $g(iT_C)$ which is circulated through the shift register. The local reference $g(iT_C)$ is a replica or delayed replica of the chip-sequence signal, used with the incoming spread-spectrum signal.

A first plurality of comparators 21, 22, 23, 24, 28 is connected or coupled to the output of the first shift register 11. A first plurality of up/down counters 31, 32, 33, 34, 38 are connected or coupled to the outputs of the first plurality of comparators, respectively. A selector 40 selects the largest value from the plurality of up/down counters 31, 32, 33, 34, 38.

In this example, each up/down counter operates at the chip rate $f_C$. A hard decision is assumed for simplification of explanation. The up/down counters increment by ±1 each time increment. The selector 40 is connected or coupled to the outputs of the plurality of up/down counters 31, 32, 33, 34, 38, respectively. The selector 40 selector one of the outputs from the plurality of up/down counters 31, 32, 33, 34, 38, according to a desired criteria. The desired criteria may be, for example, select largest value, select maximum likely value, or some other criteria.

FIG. 3 shows a modification to FIG. 2, for two processing bits per chip, and a chip-sequence signal having 256 chips. In FIG. 3, the first plurality of counters 31, 32, 33, 34, 38 would require 256, ten stage counters, with each counter operating at twice the chip rate, $2f_C$. At two processing bits per chip and a chip-sequence signal having 256 chips, there are two processing bits per sample, 00, 01, 10, 11, and the first two digital words, 00, 01 can be assigned a positive (+) direction of count or count up. The second two digital words 10, 11 can be assigned a negative (−) direction of count, or count down. Further, digital words 11, and 01 can mean count by two, and digital words 10 and 00 can mean count by one. Then the counter counts for one or two counts per sample, and operates at two times the chip rate, $2f_C$. Here, the counter can go to ±512 or 512, ten stage counters could be employed.

If there were four bits per sample, then at each sample, the counter can go up/down by 1, 2, 3, 4, 5, 6, 7, or 8. This requires $8 \times 256 = 2^{11}$, or ±2048, which requires 256, twelve-stage counters.

Since acquisition may require a very high signal-to-noise ratio, maybe 15 dB, one can choose 256 chips for the chip sequence length, and not 32 or 64 chips, which often is a size of a symbol. This results in a SNR, over the 256 chip sequence of 6–9 dB, more than the SNR of a symbol. Then losing 1.5 or 2 dB due to hard limiting is often not a serious problem. However, the present invention can still handle M-bit samples.

The present invention is much simpler to implement than the prior art bank of correlators or matched filter, for comparable lengths.

Figure 4:
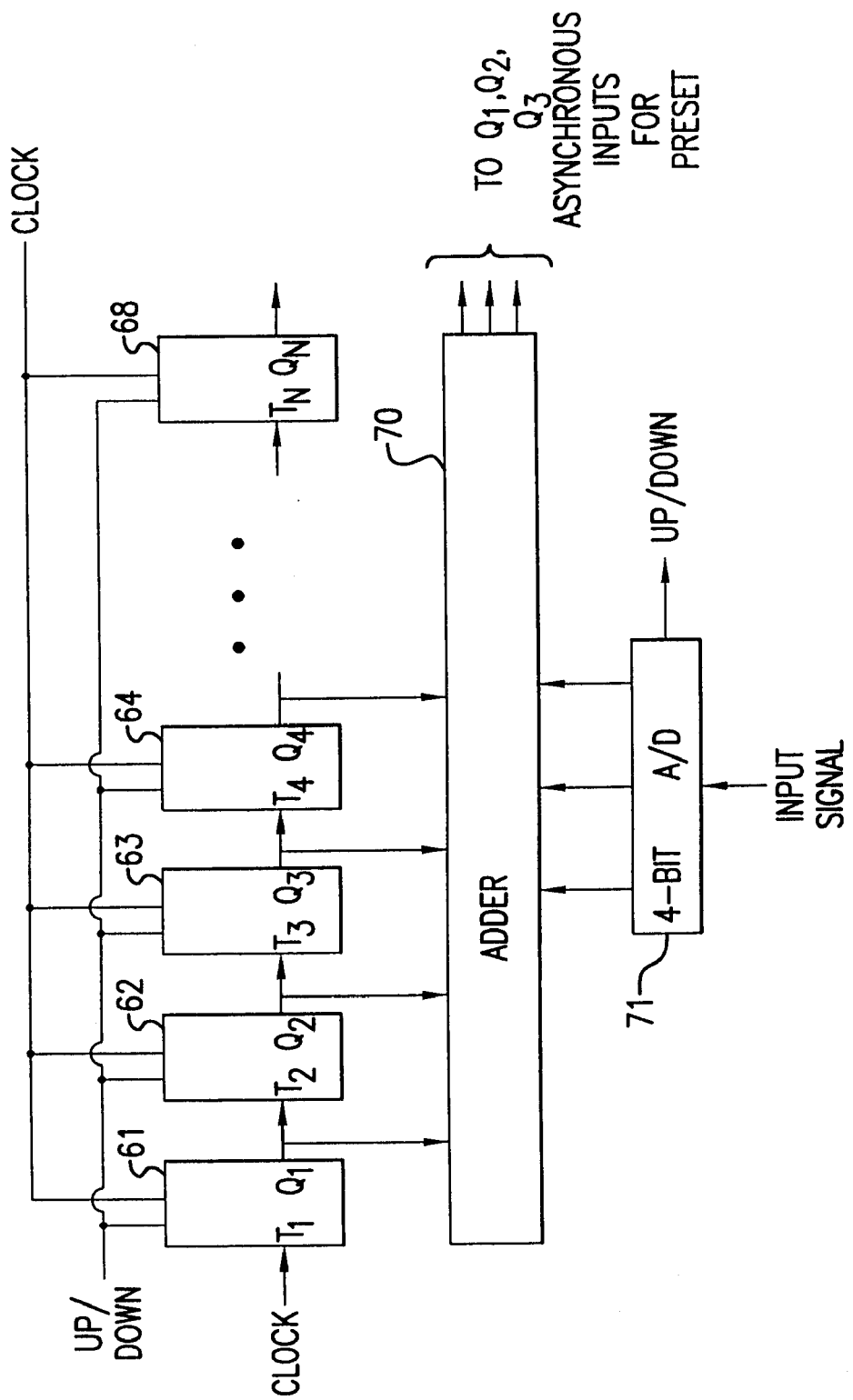
FIG. 4 is a block diagram example of an up/down counter using an asynchronous preset mechanism for a bank of correlators.

The soft-decision implementation, shown in FIG. 3, requires counting at $f_C$, $2f_C$, $3f_C$, or $4f_C$. Consider the up/down counter for a bank of correlators as shown in FIG. 4. Consider that the input sample is analog-to-digital converted using four-bit analog-to-digital (A/D) converter 71. Then there are eight positive counts or eight negative counts possible, for example, ±1, ±2, ±3, ... , ±8. Looking at the positive numbers, the eight outputs from the A/D converter 71 are:

$$K = \begin{matrix} 0000 & +1 \\ 0001 & +2 \\ 0010 & +3 \\ 0011 & +4 \\ 0111 & +8 \\ 1000 & -1 \\ 1001 & -2 \\ 1010 & -3 \\ 1011 & -4 \\ 1111 & -8 \end{matrix}$$

Looking at the counter output, just before the next 4-bit sample. This output is $I(-\Delta)$, where $$I(\Delta) = Q_N^{-\Delta} \cdots Q_4^{-\Delta} Q_3^{-\Delta} Q_2^{-\Delta} Q_1^{-\Delta} \text{ each at } t = -\Delta$$

Now sample at t=0. The sample K(0), which is a four bit word, as shown above, is added 70 to $I(-\Delta)$, using the asynchronous inputs available in $Q_1$, $Q_2$, and $Q_3$. to form I(0):

$$I(0) = I(-\Delta) + K(0)$$

After I(0) is formed the counter is toggled once through the counters 61, 62, 63, 64, 68. A new I formed is called $I(+\Delta)$. The process is repeated. Other ways of presetting the counter are well-known to those building and designing electronic circuits.

The logic circuit, by way of example, can be used for presetting each counter to less than a number indicated by a soft decision for a positive number and then toggling up, or to one greater than the number indicated if the number were negative and then toggling down. The logic circuit can preset to one less than the number and then toggle up, independent of the polarity of the number.

Figure 5:
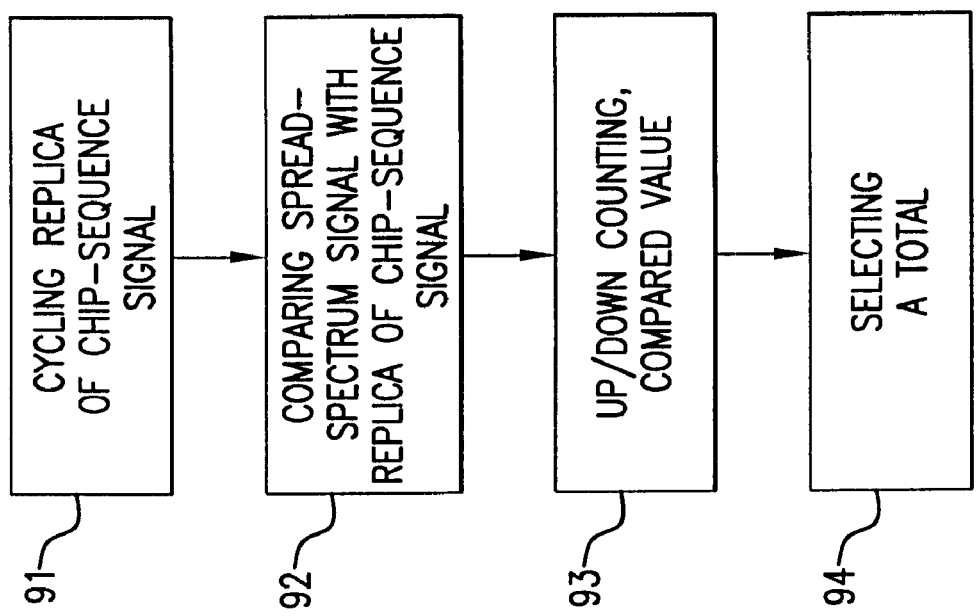
FIG. 5 is a flow chart of the method for synchronizing to the chip-sequence signal.

The present invention also includes a method for acquiring synchronization to a chip-sequence signal embedded in a spread-spectrum signal. The method, as shown in FIG. 5, comprises the steps of cycling 91 a replica or delayed replica of the chip-sequence signal in a device having a plurality of taps corresponding to the plurality of chips, respectively; comparing 92 the chip-sequence signal embedded in the spread-spectrum signal with the replica of the chip-sequence signal present at the plurality of taps, thereby generating for each tap of the device a plurality of compared values, respectively; up and down counting 93, from each output of the device, a respective plurality of compared values, respectively, thereby generating a plurality of totals, respectively; and selecting 94 a value from the plurality of totals.

The step of up and down counting, in a particular embodiment, may include the step of presetting each counter to less than a number indicated by a soft decision for a positive number and then toggling up, or to one greater than the number indicated if the number were negative and then toggling down, or preset to one less than the number and then toggle up, independent of the polarity of the number.

It will be apparent to those skilled in the art that various modifications can be made to the spread-spectrum acquisition method and system using counters of the instant invention without departing from the scope or spirit of the invention, and it is intended that the present invention cover modifications and variations of the spread-spectrum acquisition method and system using counters provided they come within the scope of the appended claims and their equivalents.

I claim:

1. An improvement for aquiring synchronization to a chip-sequence signal having, a plurality of chips, embedded in a spread-spectrum signal, comprising:

a set of M shift registers, where M is a number of shift registers, with each shift register for storing a replica or delayed replica of the chip-sequence signal, with each shift register having a plurality of taps corresponding to the plurality of chips, respectively;

a plurality of comparators, connected to the plurality of taps of the set of M shift registers, respectively, for comparing, with a delay of 1/M chip duration per shift register of the set of M shift registers, the chip-sequence signal embedded in the spread-spectrum signal with the replica of the chip-sequence signal stored in said shift register, thereby generating for the plurality of taps of said shift register a plurality of compared values at said plurality of comparators, respectively, and thereby generating for each comparator from a sequence of comparisons, a multiplicity of compared values;

a plurality of counters, connected to the plurality of comparators, respectively, for up and down counting, from each comparator, a respective multiplicity of compared values, respectively, appearing at an output of a respective comparator of said plurality of comparators, thereby generating a plurality of totals, respectively, at outputs of the plurality of counters; and selecting means, coupled to said plurality of counters, for selecting a value from the plurality of totals.

2. The improvement as set forth in claim 1, with said selecting means including means for selecting a largest value from the plurality of totals.

3. The improvement as set forth in claim 1, with said selecting means including means for selecting a maximum likely value from the plurality of totals.

4. The improvement as set forth in claim 1, with said selecting means including means for selecting a particular value, from the plurality of totals, initially crossing a threshold.

5. An improvement for acquiring synchronization to a chip-sequence signal, having a plurality of chips, embedded in a spread-spectrum signal, comprising:

a set of M shift registers, m being an integer with each shift register for storing a replica or delayed replica of the chip-sequence signal, with each shift register having a plurality of taps corresponding to the plurality of chips, respectively;

a plurality of comparators, with each comparator having a multiplicity of inputs coupled to a multiplicity of taps, respectively, of the plurality of taps, connected to the plurality of taps of the set of M shift registers, respectively, for comparing, with a delay of 1/M chip duration per shift register of the set of M shift registers, a multiplicity of chips of the chip-sequence signal embedded in the spread-spectrum signal, with a multiplicity of chips of the replica of the chip-sequence signal stored in said shift register, thereby generating for the plurality of taps of said shift register a plurality of compared values at said plurality of comparators, respectively, and thereby generating for each comparator from a sequence of comparisons, a multiplicity of compared values;

a plurality of counters, connected to the plurality of comparators, respectively, for up and down counting, from each comparator, a respective multiplicity of compared values, respectively, appearing at an output of a respective comparator of said plurality of comparators, thereby generating a plurality of totals, respectively, at outputs of the plurality of counters; and selecting means, coupled to said plurality of counters, for selecting a value from the plurality of totals.

6. The improvement as set forth in claim 5, with said selecting means including means for selecting a largest value from the plurality of totals.

7. The improvement as set forth in claim 5, with said selecting means including means for selecting a maximum likely value from the plurality of totals.

8. The improvement as set forth in claim 5, with said selecting means including means for selecting a particular value, from the plurality of totals, initially crossing a threshold.

9. An improvement for acquiring synchronization to a chip-sequence signal, having a plurality of chips, embedded in a spread-spectrum signal, comprising:

shift-register means for storing a replica or delayed replicas of the chip-sequence signal, with each replica delayed by 1/M chip duration, M being an integer with said shift-register means having a plurality of taps corresponding to the plurality of chips, respectively, of the plurality of delayed replicas of the chip-sequence signal;

comparator means, having a plurality of comparators, connected to the plurality of taps, respectively, for multiply comparing, with a delay of 1/M chip duration, the chip-sequence signal embedded in the spread spectrum signal with the plurality of delayed replicas of the chip-sequence signal stored in said shift-register means, thereby generating for the plurality to taps of said shift register means a plurality of compared values at said plurality of comparators, respectively, and thereby generating for each comparator from a sequence of comparisons, a multiplicity of compared values;

counter means, having a plurality of counters, connected to each output of said comparator means, respectively, for up and down counting, from each output of said comparator means, a respective multiplicity of compared values, respectively, appearing at each output of the plurality of counters; and selecting means, coupled to said counter means, for selecting a value from the plurality of totals.

10. The improvement as set forth in claim 9, with said selecting means including means for selecting a largest value from the plurality of totals.

11. The improvement as set forth in claim 9, with said selecting means including means for selecting a maximum likely value from the plurality of totals.

12. The improvement as set forth in claim 9, with said selecting means including means for selecting a particular value, from the plurality of totals, initially crossing a threshold.

13. A method for acquiring synchronization to a chip-sequence signal, having a plurality of chips, embedded in a spread-spectrum signal, comprising the steps of:

storing a set of M replicas of the chip-sequence signal in a shift register having a plurality of taps per replica of the chip-sequence signal, with each plurality of taps corresponding to the plurality of chips, respectively;

comparing, in a plurality of comparators, with a delay of 1/M chip duration per chip-sequence signal, the chip-sequence signal embedded in the spread-spectrum signal with the replica of the chip-sequence signal present at each of the plurality of taps, thereby generating for the plurality of taps of said shift register a plurality of compared values at said plurality of comparators, respectively, and thereby generating for each comparator from a sequence of comparisons, a multiplicity of compared values;

up and down counting, in a plurality of counters, from each output of said plurality of comparators, a respective multiplicity of compared values, respectively, thereby generating a plurality of totals, respectively, at outputs of the plurality of counters; and selecting a value from the plurality of totals.

14. The method set forth in claim 13, with the step of selecting including the step of selecting a largest value from the plurality of totals.

15. The method as set forth in claim 13, with step of selecting including the step of selecting a maximum likely value from the plurality of totals.

16. The method as set forth in claim 13, with step of selecting including the step of selecting a particular value, from the plurality of totals, initially crossing a threshold.

17. A method for acquiring synchronization to a chip-sequence signal, having a plurality of chips, embedded in a spread-spectrum signal, comprising the steps of:

cycling, in a shift register, a set of M replicas of the chip-sequence signal, with said shift register having a plurality of taps corresponding to the plurality of chips, repsectively;

comparing, in plurality of comparators, with a delay of 1/M chip duration per replica of the chip-sequence signal, a multiplicity of chips of the chip-sequence signal embedded in the spread-spectrum signal, with a multiplicity of chips of the replica of the chip-sequence signal stored in said shift register, thereby generating for the plurality of taps of said shift register a plurality of compared values at said plurality of comparators, respectively, and thereby generating for each comparator from a sequence of comparisons, a multiplicity of compared values;

up and down counting, in a plurality of counters, a respective multiplicity of compared values, respectively, thereby generating a plurality of totals, respectively,thereby generating a plurality of totals, respectively, at outputs of the plurality of counters; and selecting a value from the plurality of totals.

18. The method as set forth in claim 17, with step of selecting including the step of selecting a largest value from the plurality of totals.

19. The method as set forth in claim 17, with step of selecting including the step of selecting a maximum likely value from the plurality of totals.

20. The method as set forth in claim 17, with step of selecting including the step of selecting a particular value, from the plurality of totals, initially crossing a threshold.

21. An improvement for acquiring synchronization to a chip-sequence signal having, a plurality of chips, embedded in a spread-spectrum signal, comprising:

a shift register for storing a replica or delayed replica of the chip-sequence signal, with said shift register storing a multiplicity of processing bits per chip of the chip sequence signal, and with said shift register having a plurality of taps corresponding to the plurality of chips, respectively;

a plurality of comparators, connected to the plurality of taps, respectively, for comparing, using a multiplicity of processing bits comparison, the chip-sequence signal embedded in the spread-spectrum signal with the replica of the chip-sequence signal stored in said shift register, thereby generating for the plurality of taps of said shift register a plurality of compared values at said plurality of comparators, respectively, and thereby generating for each comparator from a sequence of comparisons, a multiplicity of compared values with each compared value having a multiplicity of processing bits;

a plurality of counters, connected to the plurality of comparators, respectively, for up and down counting, from each comparator, using a multiplicity of processing bits, a respective multiplicity of compared values, respectively, appearing at an output of a respective comparator of said plurality of comparators, thereby generating a plurality of totals, respectively, at outputs of the plurality of counters, with each total of the plurality of totals having a multiplicity of processing bits; and selecting means, coupled to said plurality of counters, for selecting, using a soft decision criteria, a value from the plurality of totals.

22. The improvement as set forth in claim 21, with said selecting means including means of selecting a largest value from the plurality of totals.

23. The improvement as set forth in claim 21, with said selecting means including means of selecting a maximum likely value from the plurality of totals.

24. The improvement as set forth in claim 21, with said selecting means including means of selecting a particular value, from the plurality of totals, initially crossing a threshold.

25. An improvement as set forth in claim 1, 5, or 21, with said plurality of counters for up and down counting at a rate by numbers one to $2^N$, where N is a number of processing bits.

26. The improvement as set forth in claim 1, 5, or 21, with said plurality of counters including a logic circuit for presetting each counter to less than a number indicated by a soft decision for a positive number and then toggling up, or to one greater than the number indicated if the number were negative and then toggling down, or preset to one less than the number and then toggle up, independent of the polarity of the number.

27. The improvement as set forth in claim 9, with said counter means for up and down counting at a rate by numbers one to $2^N$, where N is a number of processing bits.

28. The improvement as set forth in claim 9, with said counter means including a logic circuit for presetting each counter to less than a number indicated by a soft decision for a positive number and then toggling up, or to one greater than the number indicated if the number were negative and then toggling down, or preset to one less than the number and then toggle up, independent of the polarity of the number.

29. The improvement as set forth in claim 13 or 17 with the step of up and down counting including the step of up and down counting at a rate by numbers one to $2^N$, where N is a number of processing bits.

30. The improvement as set forth in claim 13 or 17 with the step of up and down counting including the step of presetting each counter to less than a number indicated by a soft decision for a positive number and then toggling up, or to one greater than the number indicated if the number were negative and then toggling down, or preset to one less than the number and then toggle up, independent of the polarity of the number.

* * * * *